(12) United States Patent
Hashimoto et al.

(10) Patent No.: US 8,524,340 B2
(45) Date of Patent: Sep. 3, 2013

(54) PRIMARY MOLDED PRODUCT FOR BIAXIAL STRETCH BLOW MOLDED BOTTLE BODY, AND BOTTLE BODY

(75) Inventors: Akio Hashimoto, Isehara (JP); Masato Suzuki, Isehara (JP); Tadashi Asai, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 952 days.

(21) Appl. No.: 10/471,996

(22) PCT Filed: Aug. 29, 2002

(86) PCT No.: PCT/JP02/08738
§ 371 (c)(1),
(2), (4) Date: Oct. 10, 2003

(87) PCT Pub. No.: WO03/018292
PCT Pub. Date: Mar. 6, 2003

(65) Prior Publication Data
US 2004/0146675 A1  Jul. 29, 2004

(30) Foreign Application Priority Data
Aug. 30, 2001 (JP) ................................ 2001-261927

(51) Int. Cl.
*B32B 27/36* (2006.01)
(52) U.S. Cl.
USPC ..... 428/35.7; 428/36.6; 428/36.7; 428/542.8; 264/512; 264/513; 264/515; 215/12.1; 215/12.2

(58) Field of Classification Search
USPC ........... 428/35.7, 36.6, 36.7, 542.8; 264/512, 264/513, 515; 215/12.1, 12.2
See application file for complete search history.

(56) References Cited

U.S. PATENT DOCUMENTS

| | | | |
|---|---|---|---|
| 4,485,134 A | | 11/1984 | Jacobsen |
| 4,535,901 A | * | 8/1985 | Okudaira et al. ............. 215/12.2 |
| 5,927,525 A | | 7/1999 | Darr et al. .................... 215/12.2 |
| 5,939,153 A | * | 8/1999 | Valyi ............................ 428/1.55 |
| 6,090,460 A | * | 7/2000 | Collette et al. ............. 428/36.91 |
| 6,280,679 B1 | | 8/2001 | Rashid et al. ................. 264/512 |

FOREIGN PATENT DOCUMENTS

| | | |
|---|---|---|
| EP | 0 161 625 A2 | 11/1985 |
| EP | 0 596 872 A2 | 5/1994 |
| JP | A 01-294426 | 11/1989 |
| JP | A 2000-326393 | 11/2000 |

* cited by examiner

*Primary Examiner* — Michele L Jacobson
(74) *Attorney, Agent, or Firm* — Oliff & Berridge, PLC

(57) ABSTRACT

The preform of the biaxially drawn, blow-molded bottle comprises polyethylene terephthalate layers 2 and at least a gas barrier layer 3 laminated with the polyethylene terephthalate layers. The gas barrier layer 3 extends downward from a level halfway to the height of the neck 4 including the neck ring 5, or at least from above the neck ring 5, down virtually to the lower end of body 6. The gas barrier layer 3 inside the wall of the neck 4 has an average thickness corresponding to a third (⅓) or less of the maximum thickness of the gas barrier layer 3 inside the wall of the body 6, allowing most of the gas barrier material to be located in the wall of the body 6. Thus, the gas barrier material is effectively utilized, and in the case of the heat-resistant bottle, the neck has the predetermined dimensions without fail after the whitening treatment.

2 Claims, 3 Drawing Sheets

PRIMARY MOLDED PRODUCT FOR BIAXIAL STRETCH BLOW MOLDED BOTTLE BODY, AND BOTTLE BODY

TECHNICAL FIELD

This invention relates to a preform of a biaxially drawn, blow-molded bottle having a gas barrier layer laminated, and to a bottle molded from such a preform.

BACKGROUND OF THE INVENTION

Biaxially drawn, blow-molded bottles made of a polyethylene terephthalate resin (hereinafter referred to as PET resin) have had a tendency in recent years in which the bottles are made in a thin-walled configuration. For this reason, the gas barrier property is in much greater demand then ever for these bottles.

In response to this demand, it was proposed to use a co-injection molding method to obtain a primary molding (hereinafter referred to also as preform), which would be molded into a bottle of a laminated structure comprising a PET resin layer, a gas barrier layer, and the other PET resin layer. In another method, the bottles, i.e., the secondary moldings, were given the gas barrier property by blending the PET resin with a gas barrier material, such as nylon (MXD-6), then injection-molding a preform from this blended material, and drawing biaxially and blow-molding this preform into a bottle.

The neck (including the neck ring) of the bottle having the laminated structure used in the former method is a portion that is not drawn, and as such, has a large thickness. At this thickness, the bottle has a full gas barrier property with no special provision of a gas barrier layer. However, in the aforementioned conventional art, the gas barrier layer is disposed over the full neck length in the similar way as in the body to prevent the upper end (flow front) of the gas barrier layer from failing to reach the lower end of the neck because of the difference in the height of the gas barrier layer. In that case, the gas barrier material usually exists in the neck portion at a rate of occupancy in the range of 20-40%, and at an average rate of about 30%, in the total amount of gas barrier material to be used for a bottle. A problem arising from this practice is that the gas barrier material used in the neck is wasted and is not effectively utilized.

In the case of a heat-resistant bottle in which the neck is whitened (thermally crystallized), the extent of shrinkage caused by the whitening treatment becomes lower because of a difference in the rate of shrinkage between the PET resin and the gas barrier material if there is a large amount of gas barrier material in the neck. Another problem found in the neck is that after the whitening treatment, the neck tends to have larger dimensions than the set values and an elliptic cross-sectional shape, thus making it difficult to secure the correct settings for the neck.

This invention has been made to solve the above-described problems found in the conventional art. Thus, the technical problem of this invention is to reduce the amount of the gas barrier material laminated in the neck portion as much as possible in the biaxially drawn, blow-molded bottle and preform, in which the PET resin layers are laminated with a gas barrier layer. An object of this invention is to make effective use of the gas barrier material in manufacturing biaxially drawn, blow-molded bottles and preforms of this invention. Another object of this invention is to ensure that the neck of the heat-resistant bottle has the predetermined dimensions after the whitening treatment.

The means of carrying out the invention of claim 1 to solve the above-described technical problems exists in the configurations:

that the preform of the biaxially drawn, blow-molded bottle comprises resinous layers mainly made of polyethylene terephthalate and at least a layer of a gas barrier material laminated with the PET resin layers;

that the gas barrier layer extends downward from a level halfway to the height of the neck including the neck ring, or at least from above the neck ring, down virtually to the lower end of body having the shape of a bottomed cylinder; and that the gas barrier layer inside the neck wall has an average thickness corresponding to a third ($1/3$) or less of the maximum thickness of the gas barrier layer inside the body wall.

In the invention of claim 1, the upper end of the gas barrier layer is disposed at a halfway point of the neck or at least above the neck ring. Even if there is some difference in the height of the gas barrier layer at the time of the molding operation, the flow front of the gas barrier layer never fails to reach the lower end of the neck. Therefore, there is no possibility that the gas barrier layer does not exist in the bottle shoulder or upper part of the body of the blow-molded bottle.

The gas barrier layer inside the neck wall extends downward from a level halfway to the neck height, and has an average thickness corresponding to a third ($1/3$) or less of the maximum thickness of the gas barrier layer inside the body wall. In that case, the amount of the gas barrier material inside the neck wall is far less than the corresponding amount existing inside the body wall. As a result, almost all the gas barrier material is disposed in the body wall. Thus, the gas barrier material can be effectively utilized in this invention.

The means of carrying out the invention of claim 2 exists in the configurations:

that the biaxially drawn, blow-molded bottle comprises resinous layers mainly made of polyethylene terephthalate and at least a layer of the gas barrier material laminated with the PET resin layers;

that the gas barrier layer extends downward from a level halfway to the height of the neck including the neck ring, or at least from above the neck ring, down virtually to a position ranging from the lower end of the body to the bottom; and that the gas barrier layer inside neck wall has a rate of occupancy of 15% or less in the total weight of the gas barrier material.

In the invention of claim 2, the gas barrier layer inside the wall of the neck of the biaxially drawn, blow-molded bottle has a rate of occupancy of 15% or less in the total weight of the gas barrier material. Even after the bottle has been molded, the amount of the gas barrier material inside the neck wall is far less than the corresponding amount existing in the body wall. As a result, almost all the gas barrier material is retained in the body wall. Thus, the gas barrier material can be effectively utilized in this invention.

In the case of heat-resistant bottle having the neck treated for whitening, the gas barrier layer inside the neck wall has quite a small thickness and is located predominantly in the lower portion of the neck. For these reasons, the gas barrier material does not affect the shrinkage caused by the whitening treatment. Therefore, after the whitening treatment, the neck remains in the predetermined dimensions without fail.

PREFERRED EMBODIMENT OF THE INVENTION

Figure 1:
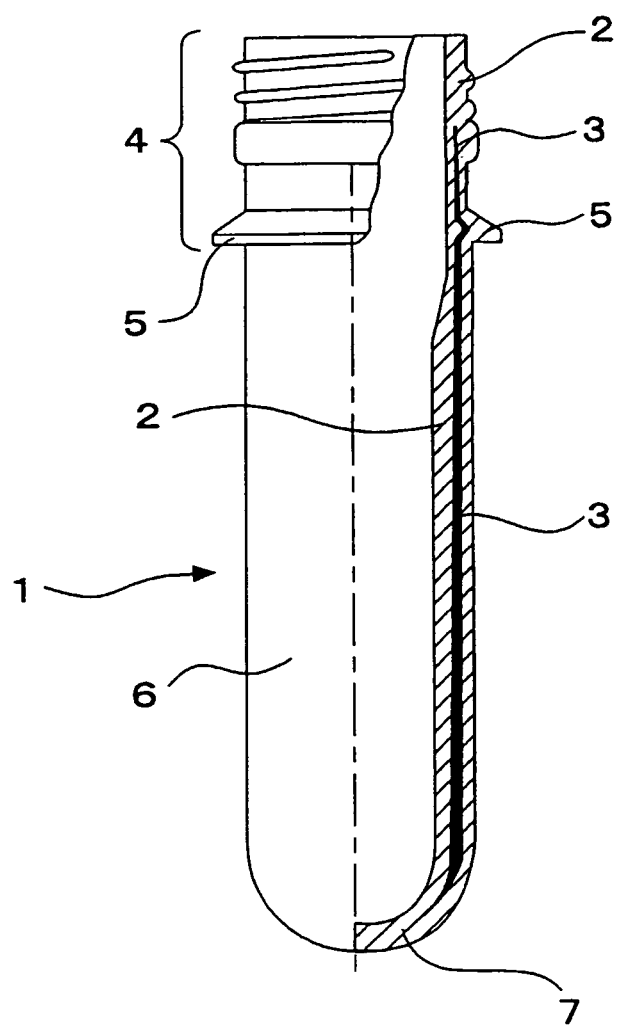
FIG. 1 is a front elevational view of the preform in the preferred embodiment of this invention, with the right half being illustrated in the longitudinal section.
Figure 2:
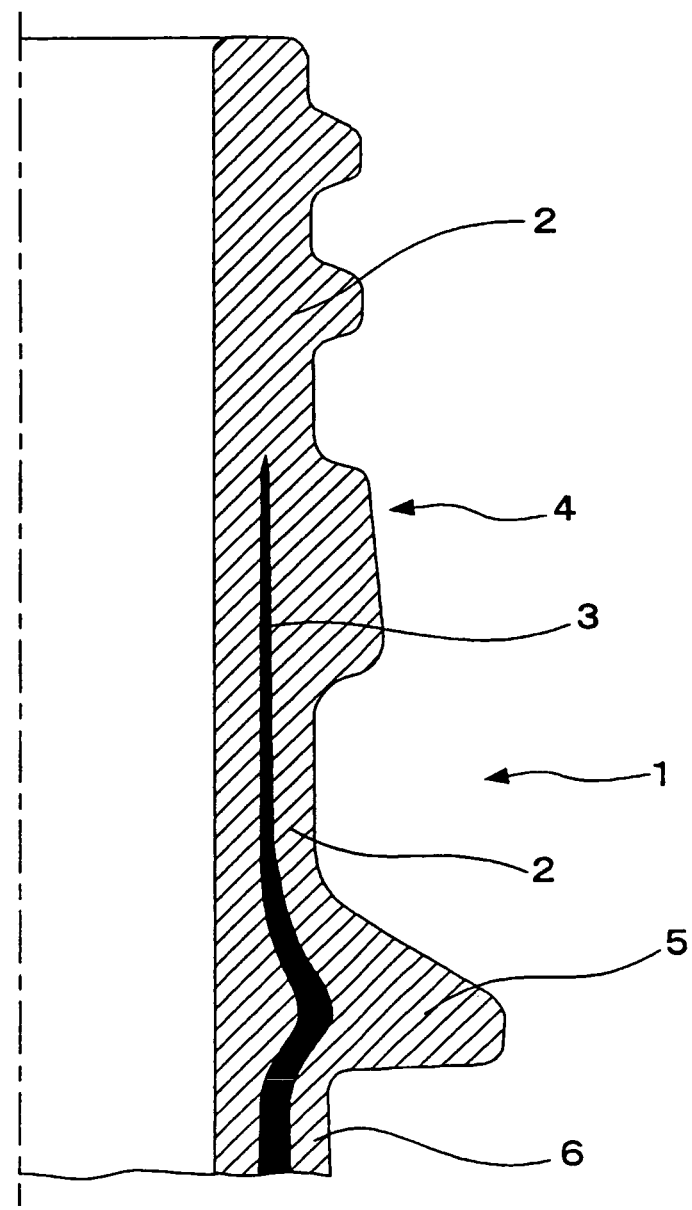
FIG. 2 is a partially enlarged longitudinal section of an important part of the preform shown in FIG. 1.

This invention is further described with respect to a preferred embodiment, now referring to the drawings. Preform 1 is the primary molding for the biaxially drawn, blow-molded bottle and is molded by the co-injection molding method so as to have a laminated structure comprising the PET resin, the gas barrier layer, and the PET resin.

The gas barrier layer 3 inside the PET resin layer 2 extends from the level roughly halfway to the height of the neck 4 including the neck ring 5 down virtually to the lower end of the body 6. The upper half of the neck 4 is provided with a screw thread on the outer peripheral wall, and this upper half portion of the neck 4 and the bottom 7 are molded solely with the PET resin.

The gas barrier layer inside the wall of the neck 4 has preferably a thickness as small as possible and more preferably a thickness corresponding to a tenth (1/10) or less of the maximum thickness of the gas barrier layer inside the wall of the body 6. However, for the practical purpose, the gas barrier layer in the neck 4 has an average thickness ranging from a third (1/3) to a tenth (1/10) of the maximum thickness of the gas barrier layer inside the wall of the body 6.

For example, in the case of preform 1 used for the 500-ml bottle, the gas barrier layer 3 of the body 6 has a maximum thickness of 0.5 mm. On the other hand, the gas barrier layer 3 inside the wall of the neck 4 is designed to have a maximum thickness of 0.3 mm, a minimum thickness of 0.05 mm, and an average thickness of 0.15 mm.

Suitable gas barrier materials include the resins having gas barrier property, such as ethylene-vinyl alcohol copolymer (EVOH) and a polyamide containing m-xylylene diamine (a product sold under the trade name of MXD-6), and also include these gas barrier resins mixed with oxygen-absorbing resins commonly used in the form of inorganic or organic salts containing a transition metal catalyst (such as Co, Fe, Mn, Ni, or Ti) in the matrix of aliphatic nylon and aromatic nylon.

This embodiment shows a structure of two materials in three layers, as exemplified by PET/gas barrier/PET in which the gas barrier layer is sandwiched by the inner and outer PET resin layers. However, this invention is not limited only to this structure, but may also have a configuration comprising a blended material in which PET is blended with a gas barrier material. In addition, it is also possible for the preform and the bottle to have another structure of two materials in five layers, as in PET/gas barrier/PET (including the case of a recycled PET material)/gas barrier/PET, or even a structure of three materials in five layers.

Figure 3:
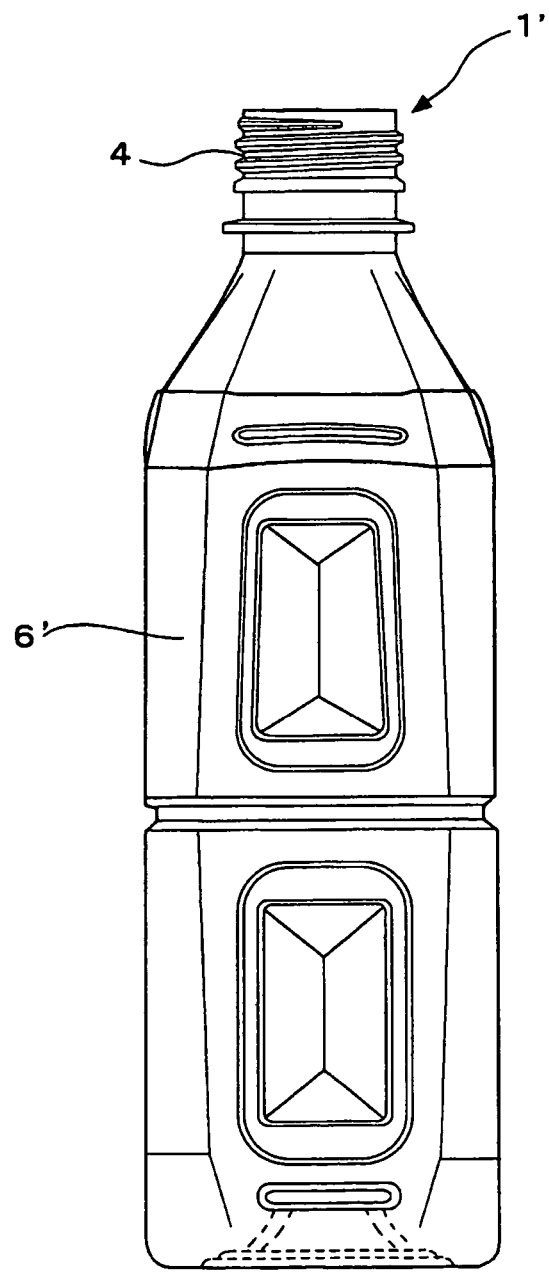
FIG. 3 is a front elevational view of the entire bottle in the preferred embodiment of this invention, which has been molded from the preform shown in FIG. 1.

FIG. 3 shows an example of the biaxially drawn, blow-molded PET resin bottle 1' that has been molded from preform 1, the primary molding according to this invention.

The bottle 1' shown in FIG. 3 is a 500-ml bottle. The neck 4 is disposed on the shoulder, and the shoulder is disposed on the upper end of the body 6'. This neck 4 is identical with the neck 4 of the preform 1. Table 1 shows the filling factors and the gas barrier properties of this bottle 1', along with those of the comparative example. The gas barrier material used in this invention is a product made by Mitsubishi Gas Chemical Company, Inc. under the trade name of MXD-6. The flow front was set at the same position for both examples.

In the biaxial drawing and blow molding of bottles, suitably applicable methods include an ordinary biaxial drawing and blow-molding method by which the final bottle is molded in a single step of drawing and blow molding, and a two-step process in which two steps of drawing and blow molding are combined with a forced heating and shrinking step, as shown in the patent publication No. 07-67732.

|  | Comparative example | | This invention | |
|---|---|---|---|---|
| Total percent by weight of the gas barrier material, wt. % | 5.5 | | 5.5 | |
| Weight of gas barrier material at the neck, g | 0.375 | 0.405 | 0.130 | 0.144 |
| Rate of occupancy of the gas barrier material at the neck | 21.3 | 23.0 | 7.4 | 8.2 |
| Volume of penetrated oxygen (cc/day/bottle) | 0.0128 | 0.0133 | 0.0078 | 0.0066 |
| Average thickness of the gas barrier layer in the body wall, μ | 28 | 29 | 35 | 35 |
| Rate of improvement in the gas barrier properties, as compared to the single PET layer | ×2.3 | ×2.26 | ×3.85 | ×4.55 |
| Rate of improvement in the gas barrier properties, as compared to the comparative example | | 1 | | ×1.88 |

Also concerning the bottle 1' biaxially drawn and blow molded from the preform 1 according to this invention, Table 1 clearly shows that the amount of gas barrier material used in the wall of the neck 4 is reduced greatly, as compared to the amount used in the comparative example, since the amount used in the neck is as low as 15% or less of the total amount of the gas barrier material. Instead, the gas barrier layer 3 inside the wall of the body 6' is allowed to have a much more thickness. In this manner, the gas barrier material can be effectively utilized so as to give improved gas barrier properties to the bottle 1'.

INDUSTRIAL APPLICABILITY

In the invention of claim 1, the gas barrier layer inside the neck wall extends downward from a level halfway to the neck height, and is molded to have an average thickness corresponding to a third (1/3) or less of the maximum thickness of the gas barrier layer inside the body wall. In this configuration, it is possible to reduce drastically the amount of the gas barrier material to be used in the neck wall, and thus, to make effective use of the gas barrier material.

The upper end of the gas barrier layer is disposed at a level halfway to the neck height or at least above the neck ring. Even if there is some difference in the height of the gas barrier layer at the time of the molding operation, the flow front of the gas barrier layer never fails to reach the lower end of the neck. Therefore, there is no possibility that the gas barrier layer does not exist in the bottle shoulder or upper part of the body of the blow-molded bottle.

In the invention of claim 2, the gas barrier layer inside the wall of the neck of the biaxially drawn, blow-molded bottle has a rate of occupancy of 15% or less in the total weight of the gas barrier material. Even after the bottle has been molded, the amount of the gas barrier material inside the neck wall is far less than the corresponding amount existing in the body wall. As a result, almost all the gas barrier material is disposed in the body wall. Thus, the gas barrier material can be effectively utilized in this invention.

In the case of heat-resistant bottle having the neck treated for whitening, the gas barrier layer inside the neck wall has so small a thickness that the gas barrier material does not affect the shrinkage caused by the whitening treatment. Therefore, after the whitening treatment, the neck remains in the predetermined dimensions without fail.

The invention claimed is:

1. A biaxially drawn, blow-molded bottle, comprising:
a body having a bottom;
a neck, including an opening and a neck ring remote from the opening, the neck being subjected to a thermal crystallization treatment that is a whitening treatment;
a screw threaded portion positioned on the neck between the opening and the neck ring;
resinous layers mainly made of polyethylene terephthalate; and
at least a layer of a gas barrier material laminated with said polyethylene terephthalate layers, wherein said gas barrier layer extends only from (a) a level lower than the screw-threaded portion in a direction toward the bottom of the body and falling in a range between a half-height of the neck, including the neck ring, and an upper portion of said neck ring, to (b) a position in a range from a lower end of the body to the bottom, to avoid deformation from occurring in the screw-threaded portion of a cap, because when the neck is thermally crystallized, the extent of shrinkage caused by the thermal crystallization treatment becomes lower because of a difference in the rate of shrinkage between the PET resin and the gas barrier material, and because after the thermal crystallization treatment, the neck tends to have larger dimensions than the set values and an elliptic cross-sectional shape, thus making it difficult to form the neck within set values, and wherein the gas barrier layer inside the wall of said neck has a rate of occupancy of 8.2% or less in the total weight of the gas barrier material.

2. A biaxially drawn, blow-molded bottle according to claim 1 wherein a portion of the gas barrier layer at the neck protrudes outward into the neck ring.

* * * * *